US010284571B2

(12) United States Patent
Nazzal

(10) Patent No.: US 10,284,571 B2
(45) Date of Patent: May 7, 2019

(54) RULE BASED ALERTING IN ANOMALY DETECTION

(75) Inventor: Robert N. Nazzal, Watertown, MA (US)

(73) Assignee: Riverbed Technology, Inc., San Francisco, CA (US)

(*) Notice: Subject to any disclaimer, the term of this patent is extended or adjusted under 35 U.S.C. 154(b) by 2746 days.

(21) Appl. No.: 10/880,332

(22) Filed: Jun. 28, 2004

(65) Prior Publication Data

US 2005/0289219 A1    Dec. 29, 2005

(51) Int. Cl.
*H04L 29/06* (2006.01)

(52) U.S. Cl.
CPC ...... *H04L 63/1408* (2013.01); *H04L 63/1441* (2013.01)

(58) Field of Classification Search
CPC ........... H04L 63/1416; H04L 63/1408; H04L 63/1458; H04L 63/1441; H04L 63/1425; H04L 63/1433; H04L 63/145; H04L 41/22; H04L 63/20; H04L 2463/141; H04L 41/0631; H04L 41/06
USPC ........................................................ 709/217
See application file for complete search history.

(56) References Cited

U.S. PATENT DOCUMENTS

| | | | |
|---|---|---|---|
| 6,088,804 A | 7/2000 | Hill et al. | |
| 6,578,077 B1* | 6/2003 | Rakoshitz | H04L 12/2602 709/224 |
| 6,597,777 B1* | 7/2003 | Ho | 379/133 |
| 6,597,957 B1 | 7/2003 | Beakley | |
| 6,678,827 B1 | 1/2004 | Rothermel et al. | |
| 6,990,591 B1 | 1/2006 | Pearson | |
| 7,305,708 B2* | 12/2007 | Norton et al. | 726/23 |
| 7,779,119 B2* | 8/2010 | Ginter et al. | 709/224 |
| 2002/0093527 A1* | 7/2002 | Sherlock et al. | 345/736 |
| 2003/0107590 A1* | 6/2003 | Levillain et al. | 345/736 |
| 2004/0015905 A1* | 1/2004 | Huima | G06F 8/67 717/141 |
| 2004/0098474 A1* | 5/2004 | Galou et al. | 709/223 |
| 2004/0210654 A1* | 10/2004 | Hrastar | 709/224 |
| 2005/0135266 A1* | 6/2005 | Horng et al. | 370/252 |
| 2005/0213553 A1* | 9/2005 | Wang | 370/349 |
| 2013/0031037 A1* | 1/2013 | Brandt et al. | 706/12 |

OTHER PUBLICATIONS

U.S. Appl. No. 60/067,857 dated Dec. 5, 1997 by Rakoshitz at al.—attached (pdf version).*
U.S. Appl. No. 60/067,857, filed Dec. 1997, Vaid, Aseem et al.*
U.S. Appl. No. 60/067,857, filed Dec. 5, 1997.

* cited by examiner

*Primary Examiner* — Davoud A Zand
*Assistant Examiner* — Kishin G Belani
(74) *Attorney, Agent, or Firm* — Park, Vaughan, Fleming & Dowler LLP; Laxman Sahasrabuddhe

(57) ABSTRACT

A graphical user interface for constructing rules to run on an intrusion detection system is described. The user interface includes a field that specifies a first set of nodes on a network by Host-Group, a field that specifies a second set of nodes on a network by Host-Group and a field which determines whether to interpret the first and second host-group fields as Client, server, source, destination or any of these.

15 Claims, 14 Drawing Sheets

| Time Slice | Fri | Thu | Wed | ... | Sun | Sat | Fri |
|---|---|---|---|---|---|---|---|
| Services provided by A (Web Server) to B (Desktop) | | | | | | | |
| WWW (TCP:80) | | | | | | | |
| Bytes / sec | 2k | 3k | 1k | ... | 2k | 4k | 3k |
| Packets / sec | 5 | 6 | 2 | | 5 | 9 | 5 |
| Conn's. / hr | .3 | .5 | .3 | | .2 | .3 | .3 |
| SSH (TCP:22) | | | | | | | |
| Bytes / sec | 1k | 3k | 4k | ... | 1k | 2k | 3k |
| Packets / sec | 2 | 6 | 9 | | 2 | 5 | 6 |
| Conn's. / hr | .3 | .5 | .3 | | .3 | .3 | .5 |
| Services provided by B (Desktop) to A (Web Server) | | | | | | | |
| SSH (TCP:22) | | | | | | | |
| Bytes / sec | 21k | 0 | 0 | ... | 0 | 0 | 0 |
| Packets / sec | 10 | 0 | 0 | | 0 | 0 | 0 |
| Conn's. / hr | 1 | 0 | 0 | | 0 | 0 | 0 |

FIG. 5

RULE BASED ALERTING IN ANOMALY DETECTION

BACKGROUND

This invention relates to techniques to detect network anomalies.

Networks allow computers to communicate with each other whether via a public network, e.g., the Internet or private networks. For instance, many enterprises have internal networks (intranets) to handle communication throughout the enterprise. Hosts on these networks can generally have access to both public and private networks.

Managing these networks is increasingly costly, while the business cost of network problems becomes increasingly high. Managing an enterprise network involves a number of inter-related activities including establishing a topology, establishing policies for the network and monitoring network performance. Another task for managing a network is detecting and dealing with security violations, such as denial of service attacks, worm propagation and so forth.

SUMMARY

According to an aspect of the invention, a graphical user interface for constructing rules to run on an intrusion detection system includes a field that specifies a first set of nodes on a network by Host-Group, a field that specifies a second set of nodes on a network by Host-Group, and a field which determines whether to interpret the first and second host-group fields as Client, server, source, destination or any of these.

The graphical user interface has fields for the first set of nodes and second set of nodes specifies groups of hosts. The graphical user interface of includes a per host and aggregate control that determines whether the rule is applied to any host in the group,or to the aggregate of the entire group's traffic and control buttons to allow a user to choose an address of a node or to choose a grouped set of nodes. The graphical user interface includes a field to specify a network traffic direction of traffic to monitor and a field to specify a time limit of applying the rule. The graphical user interface includes a field to specify services used by the nodes that are tracked and a field to specify a threshold type used by the tracked nodes. The graphical user interface includes a field to specify a tracking direction of traffic flow between the tracked nodes. The field to specify threshold type is used to specify when parameter exceeds a traffic upper threshold and/or a traffic lower threshold.

According to an additional aspect of the invention, a method of producing a rule to track events in a network includes entering data in a field that specifies a first set of nodes on a network by Host-Group, entering data in a field that specifies a second set of nodes on a network by Host-Group and entering data in a field which determines whether to interpret the first and second host-group fields as client, server, source, destination or any of these.

According to an additional aspect of the invention, a computer program product residing on a computer readable medium for producing a graphical user interface for an intrusion detection system includes instructions for causing a computer to generate the user interface including a field that specifies a first set of nodes on a network by Host-Group, a field that specifies a second set of nodes on a network by Host-Group, and a field which determines whether to interpret the first and second host-group fields as client, server, source, destination or any of these.

According to an additional aspect of the invention, a method includes producing a rule that is used by an intrusion detection system to check traffic over a network, by specifying a day and time period when the rule is generated, specifying a first set of nodes on a network by Host-Group and a second set of nodes on a network by Host-Group, specifying a type basis which determines how to interpret first and second tracked units, specifying services to track as used or provided by the tracked units, specifying a direction of traffic flow between the tracked units and specifying a duration of the condition necessary to qualify as an event.

According to an additional aspect of the invention, a method includes providing a user interface, including options to detect a failed service, detect presence of services, detect communication between certain hosts or groups, detect hosts exceeding traffic thresholds; and in response to a selecting one or more of the options, producing a series of type-specific pages, for the selected detection option calling for specific data for each of the selected options.

One or more aspects of the invention may provide one or more of the following advantages.

Users define rules to detect new events. The interface allows a user to define a rule by specifying the basis for tracking, e.g., client/source or server/destination, as well as traffic direction, ports, a time limit, and severity. This allows the user to specify what type of event to detect. When the rule's conditions are met, an event is generated with a particular severity determined according to the rule.

The interface allows for viewing, editing, deleting or copying an existing rule. Common uses of rule-based events include generating alerts when any connection of a specified type occurs (even if only one packet) and upper or lower limit for traffic of a specific type is exceeded.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 5 is a block diagram depicting a record in the connection table.

DETAILED DESCRIPTION

Figure 1:
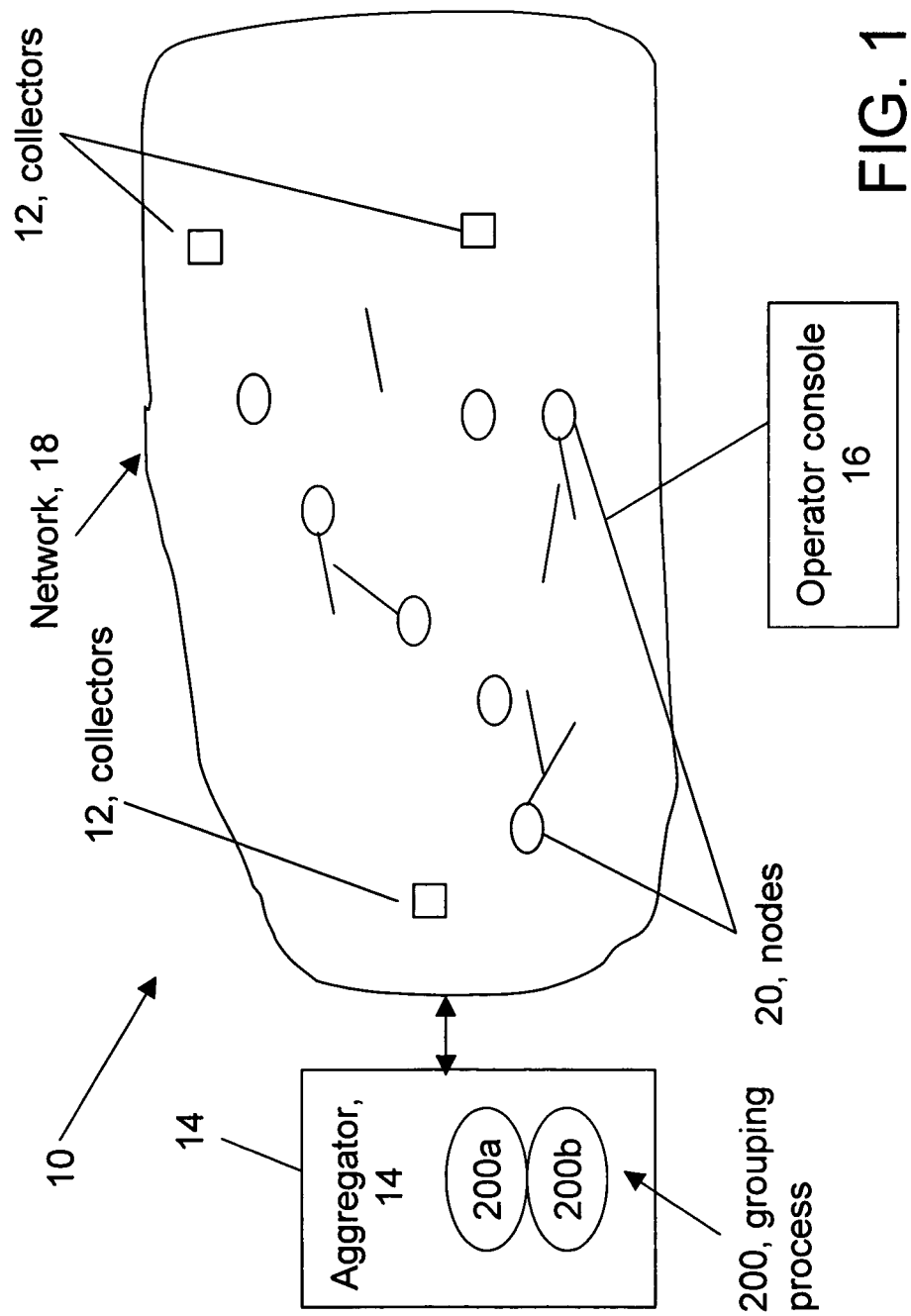
FIG. 1 is a block diagram of a network including anomaly detection.

Referring to FIG. 1, an anomaly detection system 10 to detect anomalies and process anomalies into events is shown. The anomaly detection system 10 can be used to detect denial of service attacks (DoS attacks), unauthorized access attempts, scanning attacks, worm propagation, network failures, and addition of new hosts in a network 18. The system 10 includes collector devices 12 and at least one aggregator device 14 and an operator console 16 that communicates with and can control collector devices 12 and the at least one aggregator device 14. The collector devices 12 and the at least one aggregator 14 are disposed in the network 18. The collector devices 12 connect to network devices 15, e.g., switches, hosts, routers, etc. in line, or via a tap, e.g., using mirror, SPAN ports or other passive link taps. The collector devices 12 collect information such as source and destination addresses, transport protocol, source and destination ports, flags, and length. Periodically, the collector devices 12 send to the aggregator 14 a record of the number of packets, bytes, and connections between every host pair observed by the collector 12, broken down by port and protocol. In addition, the collector devices 12 send summary information concerning flags seen on TCP packets.

The aggregator 14 can also execute a grouping process 200 that efficiently partitions hosts on a network into groups in a way that exposes the logical structure of the network 18. The grouping process 200 assigns nodes to groups can include a classification process 200a that classifies hosts by groups and a correlation process 200b that correlates groups.

Figure 2:
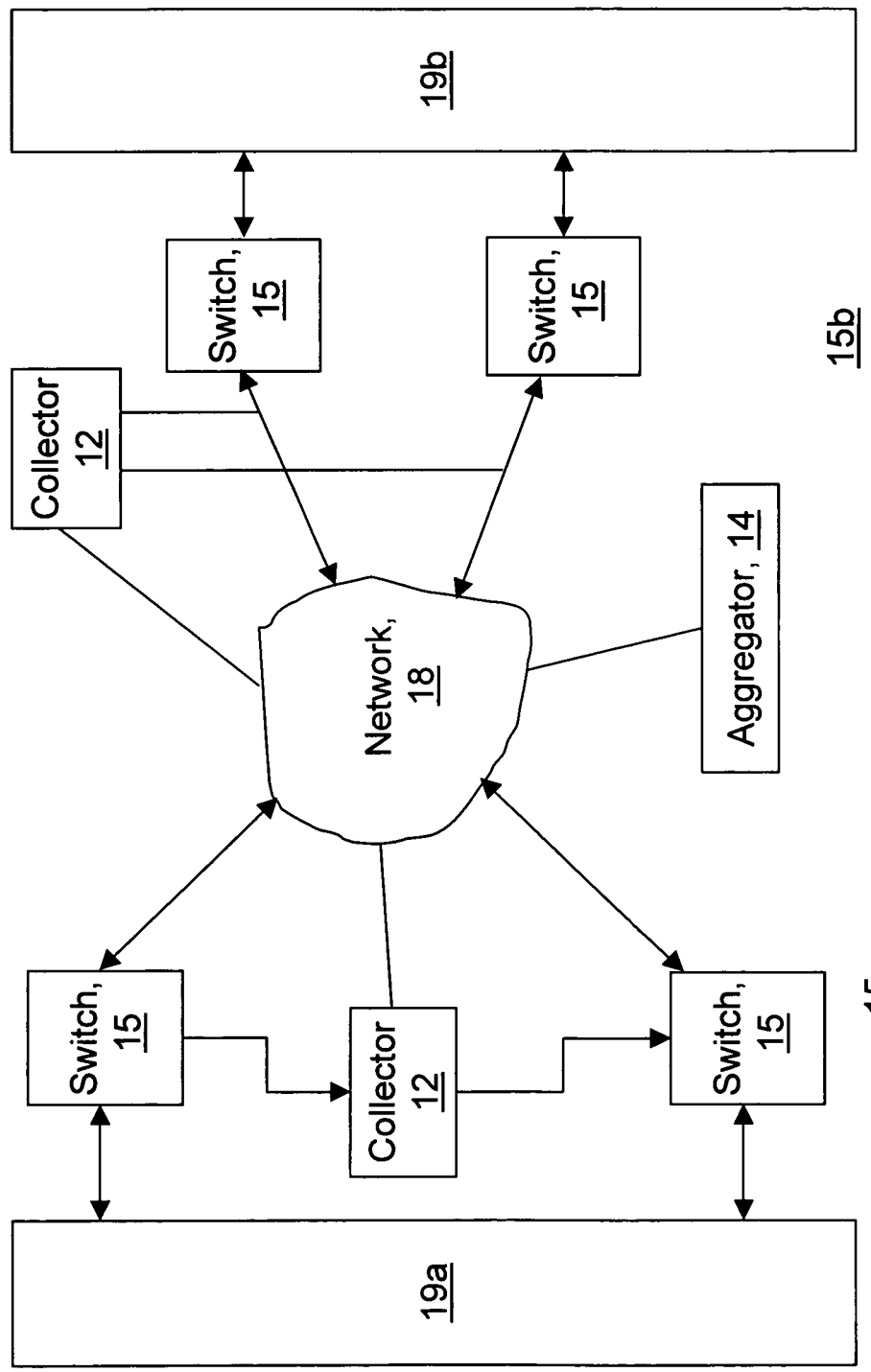
FIG. 2 is a block diagram depicting exemplary details of anomaly detection.

Referring to FIG. 2, collectors 12 are shown disposed to sample or collect information from network devices 15, e.g., switches as shown. The collector devices 12 send the information to the aggregator 14 over the network 18. The collectors 12 in one configuration sample all traffic from a downstream network 19a provided that the traffic traverses the switches 15, whereas in another configuration the collectors 12 sample traffic from downstream network 19b that enters and leaves the switches 15.

The architecture is based on an examination of current bytes/second, packets/second, connections/hour statistics, and so forth. The architecture compares these to historical data. The data collectors are devices that are coupled actively or passively on a link and collect the above mentioned as well as other statistics. Data collectors 12 can be connected via a tap or can span port on a monitored device (e.g., router, etc.) over intervals of time. Over such intervals of time, e.g., every 30 seconds, the data collectors 12 send reports (not shown) to an aggregator. The report can be sent from the data collector to the aggregator over the network being monitored or over a hardened network (not shown).

The architecture is based on an examination of current bytes/second, packets/second, connections/hour statistics, and so forth. The architecture compares these to historical data. The data collectors are devices that are coupled actively or passively on a link and collect the above mentioned as well as other statistics. Data collects 12 can be connected via a tap or can span port on a monitored device (e.g., router, etc.) over intervals of time. Over such intervals of time, e.g., every 30 seconds, the data collectors 12 send reports (not shown) to an aggregator. The report can be sent from the data collector to the aggregator over the network being monitored or over a hardened network (not shown).

There are a defined number of sources, a defined number of destinations, and a defined number of protocols on a given network. Over a defined interval (typically 30 seconds), the data collectors 12 monitor all connections between all pairs of hosts and destinations using any of the defined protocols. At the end of each interval, these statistics are summarized and reported to the aggregator 14. The values of the collected statistics are reset in the data collectors after reporting. The number of connections between ports using an unknown protocol is also monitored.

If more than one data collector saw the same source and destination communicating, the following could have occurred. The data collectors could be in parallel and each saw a portion of the communication. Alternatively, the data collectors could be in series and both data collectors saw the entire communication. Given the rate at which parallel connections may change, the aggregator assumes that the data collectors are in series. The maximum of two received values is taken as a value for the connection and it is assumed that the lower value reflects dropped packets. Other arrangements are possible.

Figure 3:
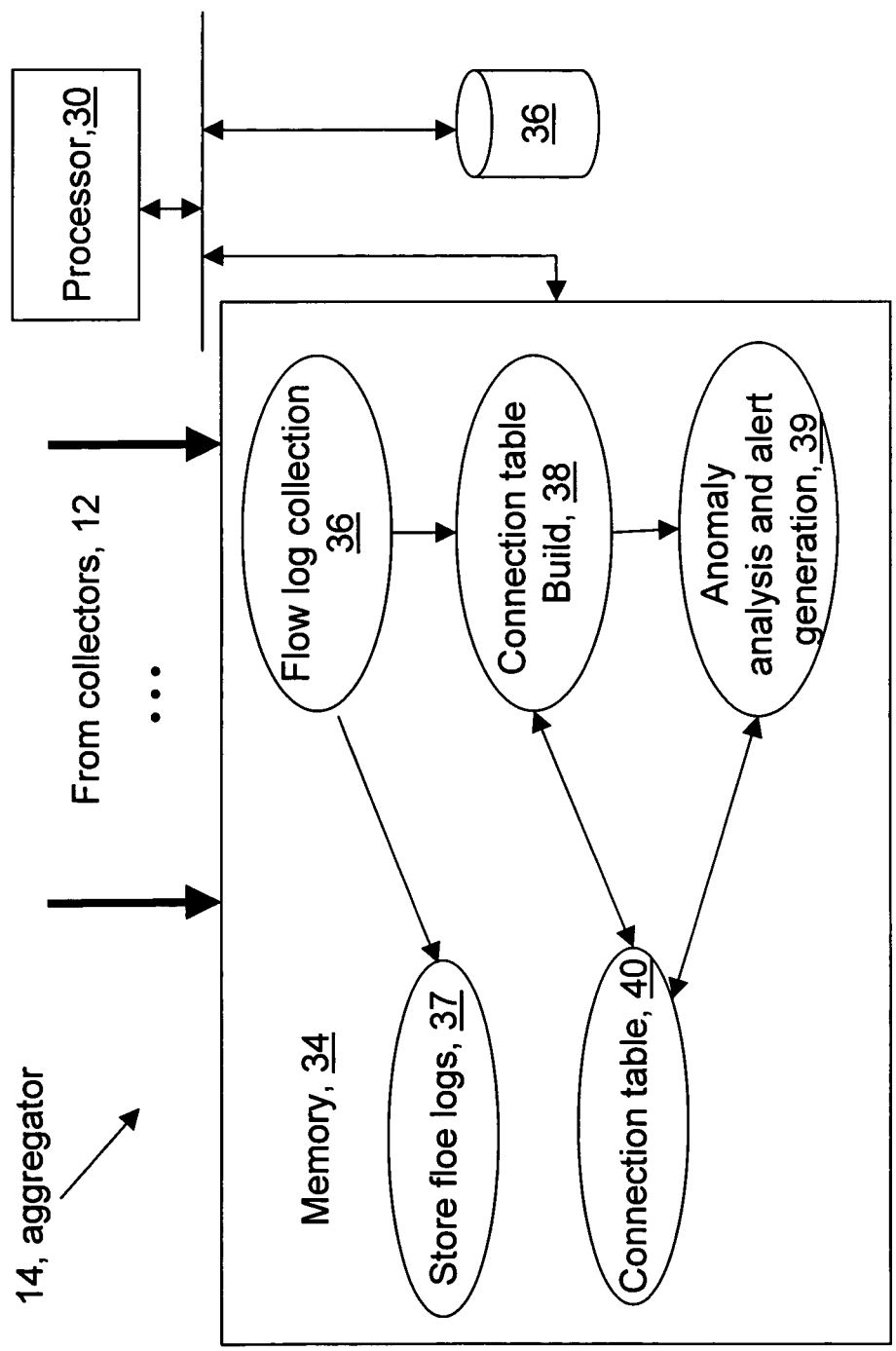
FIG. 3 is a block diagram depicting an aggregator.

Referring to FIG. 3, the aggregator 14 is a device (a general depiction of a general purpose computing device is shown) that includes a processor 30 and memory 32 and storage 34. Other implementations such as Application Specific Integrated Circuits are possible. The aggregator 14 includes a process 36 to collect data from collectors 12 and a process 38 to produce a connection table 40. In addition, the aggregator includes anomaly analysis and event process 39 to detect anomalies and process anomalies into events that are reported to the operator console or cause the system 10 to take action in the network 18. Anomalies in the connection table can be identified as events including denial of service attacks, unauthorized access attempts, scanning attacks, worm propagation, network failures, addition of new hosts, and so forth. In some embodiments the aggregator can be a clustered aggregator.

Figure 4:
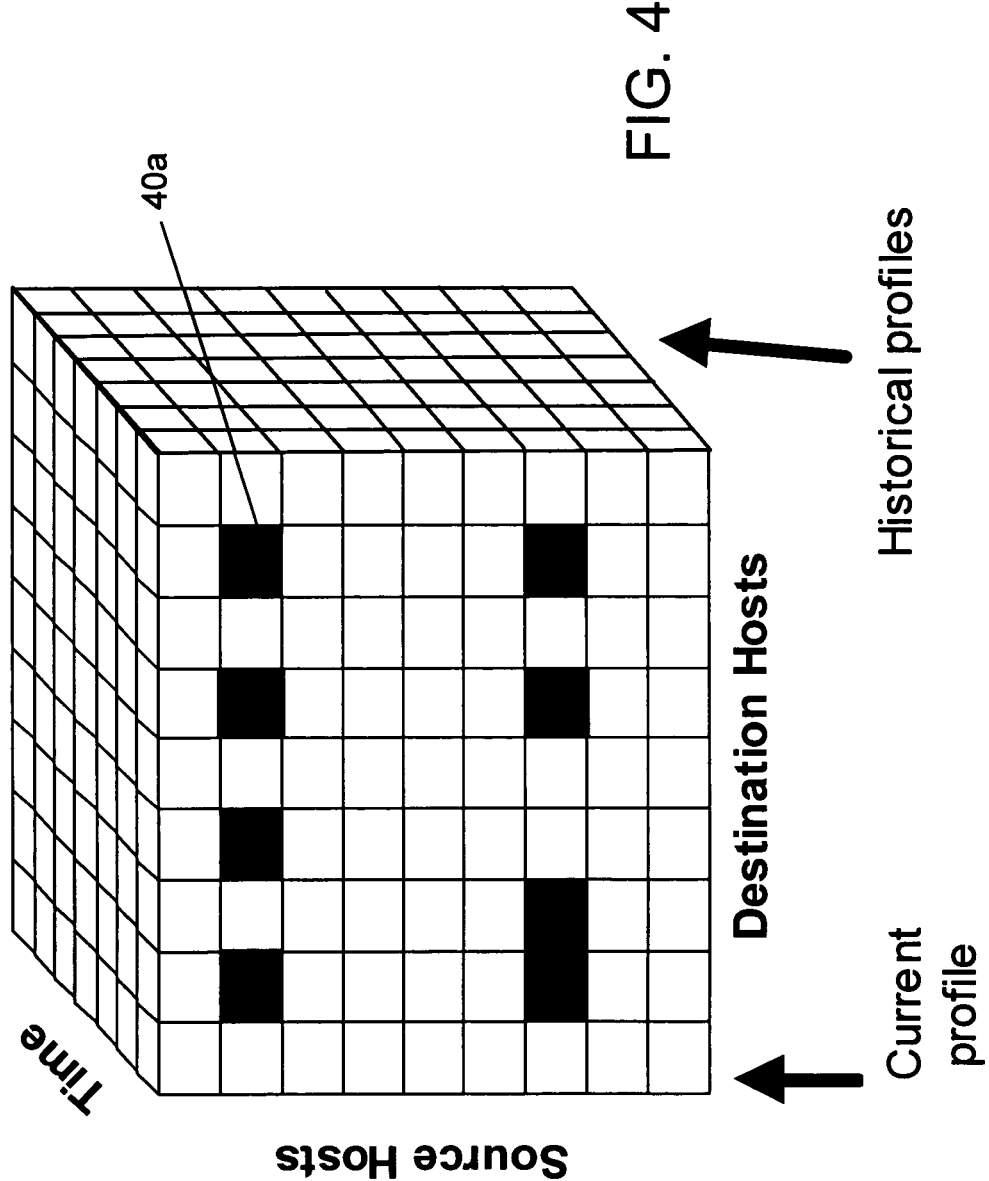
FIG. 4 is a block diagram depicting a connection table.

Referring to FIG. 4, the connection table 40 is a data structure that maps each host (e.g., identified by IP address) to a "host object" that stores information about all traffic to or from that host. In one implementation of the table, source address is one dimension, destination is a second dimension and time is a third dimension. The time dimension allows a current record and historical records to be maintained.

Using IP addresses to uniquely identify hosts could be inadequate in environments with Dynamic Host Configuration Protocol (DHCP) assignments. Thus alternatively, the administrator can configure a DHCP server to produce a medium access control (MAC) address to IP address map. The MAC address to IP address map is sent as a flat file to the aggregator 14. Thereafter, when a data collector 12 reports an IP address and counter to/from values, the aggregator 14, for each IP address checks in the most recent map. If the IP address is found in the map, then the host is managed by a DHCP server and the host ID is the host's MAC address, otherwise the Host ID is the host IP address.

The host object, e.g., 40a of a host "A" also maps any host (IP address) "B" with which "A" communicates to a "host pair record" that has information about all the traffic from "A" to "B" and "B" to "A". This two-level map enables the system 10 to efficiently obtain summary information about one host and about the traffic between any pair of hosts, in either direction.

Hashing is used to "lookup or update" information about any host or host pair on the network 18. The connection table 40 includes additional structure to allow efficient traversal of all hosts or host pairs and supports efficient representation of groups of related hosts, e.g., a role grouping mechanism as discussed below. Alternatively, the role grouping can be stored separately from the connection table.

The connection table uses a hash map from host identifiers (IP or MAC addresses) to "Host" objects, as discussed. Each Host object maintains aggregate traffic statistics for the associated host ("H"), and a hash map (a 2nd level hash map) from host identifiers (IP addresses) of peers of host H.

(i.e., hosts that host H had communicated with) as "Host-Pair" objects. Each HostPair object maintains traffic statistics for each pair of hosts (H and H's peer). To allow more efficient analysis; HostPair objects are duplicated across Host objects. For instance, the HostPair "AB" is maintained both in the hash map within Host "A" and in the hash map within Host "B." Group information is embedded in the connection table, with each Host object storing information about the group that the associated host belonged to. The connection table maintains a list of all groups and their member hosts.

Figure 4A:
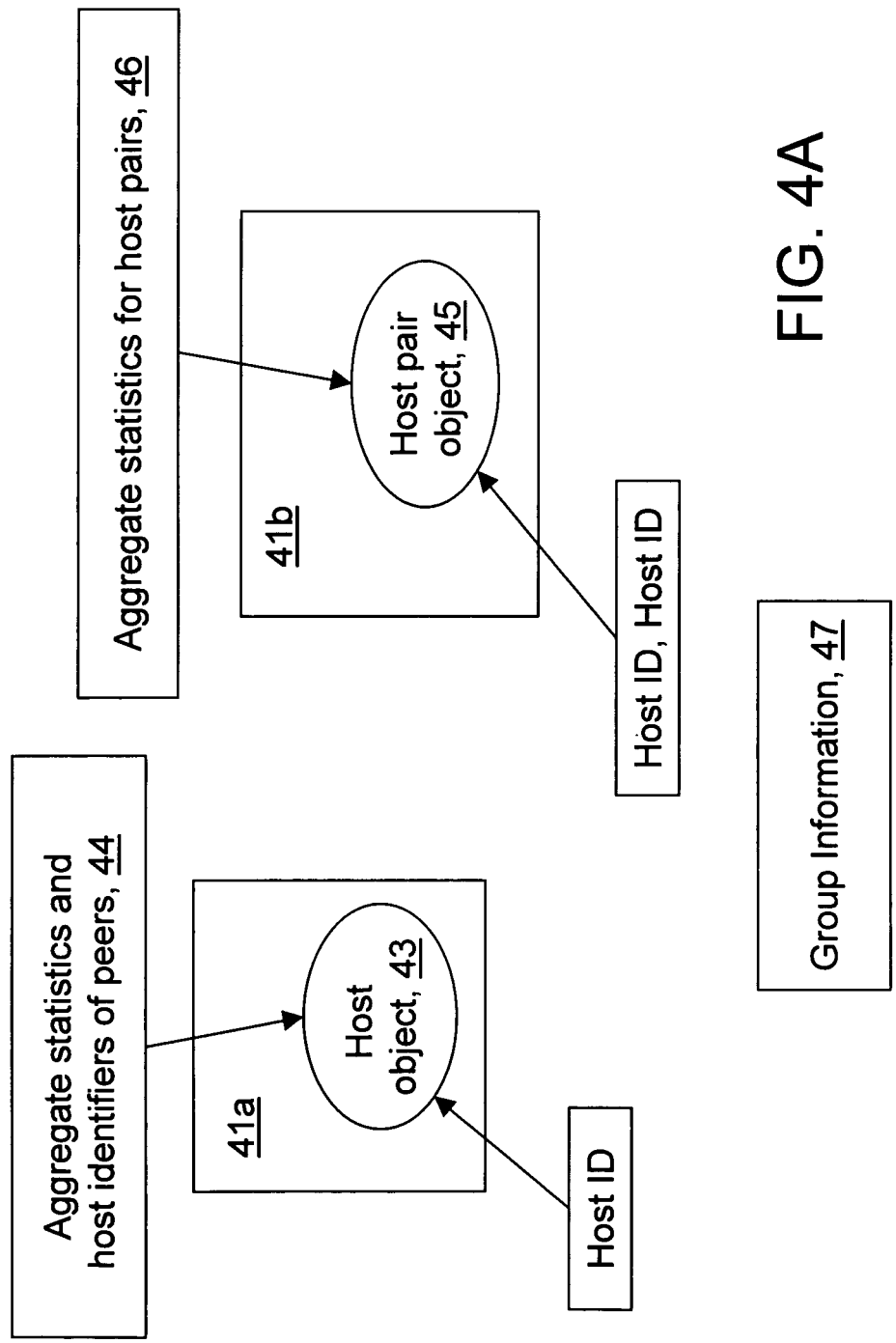
FIG. 4A is a block diagram of an alternative connection table.

Referring to FIG. 4A, in an alternative implementation 41 of the connection table 40, the connection table 41 is split into two hash maps 41a and 41b, a "host hash" map 41a and a "host pair" hash map 41b. The "host hash" map 41a maps host identifiers (IP or MAC addresses) to new Host objects 43. Each new Host object 43 has the aggregate traffic statistics for the associated host, as well as a list of the host identifiers (IP or MAC addresses) of all the peers of that host 44. The "host pair" hash map 41b maps pairs of host identifiers to Host Pair objects 45 that maintain traffic statistics 46 for pairs of hosts. In this implementation Host Pair objects 45 need no longer be duplicated, as discussed above.

For example, if host A and host B communicate, then the host map has a Host object 43 for A that lists B as a peer, the host map has a Host object 43 for B that lists A as a peer, and the host pair map has a Host Pair object 45 for AB. Group information is stored in a separate table 47 that is loaded, saved, and otherwise managed separately from the traffic statistics in the connection table. It does not need to be in memory unless it is actually needed.

Factoring out the group information and moving from many hash maps (top level map, plus one 2nd level map per Host object) to just two makes this implementation of the connection table more compact and decreases memory fragmentation, improving aggregator performance and scalability.

In one embodiment, only "internal hosts" (defined based on configurable IP address ranges) are tracked individually as described above. The aggregator 14 buckets all other ("external") hosts into a fixed number of bins according to 8- or 16-bit CIDR (Classless Inter-domain Routing) prefix. This approach preserves memory and computational resources for monitoring of the internal network 18 but still provides some information about outside traffic. Other arrangements are possible, for instance bucketing can be turned off if desired, so that each external host is tracked individually.

Referring to FIG. 5, exemplary contents of the host object 40a are depicted. Similar statistics can be collected for host objects 43. As shown, the contents of the host object 40a in the connection table 40 include a measure of the number of bytes, packets, and connections that occurred between hosts during a given time-period, here on a daily basis. Data is broken down per-protocol for every well-known transport protocol (e.g., TCP, UDP, ICMP, and the 132 others defined by the "Internet Assigned Numbers Authority" and for several hundred well-known application-level protocols (e.g., SSH, HTTP, DNS, and so forth). For every application-level protocol, and for every pair of hosts "A" and "B", the Connection Table stores statistics for traffic from host A to host B and from host B to host A both for the case where "A" is the server and the case where "B" is the server. Unknown protocols are counted together.

Since most hosts only use a small fraction of the well-known protocols, the footprint of the data structure is kept manageable by storing protocol-specific records as (protocol, count) key-value pairs. Further, since the protocol distribution is typically skewed (a few protocols account for the majority of traffic on each host), key-value pairs are periodically sorted by frequency to improve amortized update time.

Individual host records have no specific memory limit. If a particular host connects with many other hosts and uses many protocols, all that information will be recorded. However, the total memory used by the aggregator 14 is bounded in order to avoid denial of service attacks on the aggregator 14. For example, an attacker spoofing random addresses can cause the aggregator 14 to allocate new host structures and quickly consume memory. If an aggregator ever exceeds a memory utilization threshold "m_{hi}", it de-allocates records until its memory utilization falls below "m_{hi}". Several different algorithms can be used for picking records to de-allocate. Some of the algorithms that can be used include random eviction, picking low-connectivity hosts first, high-connectivity hosts first, and most recently added hosts first. Similar measures are also taken on the probes 12 to ensure high performance and limit Probe-Aggregator communication overhead.

Figure 6:
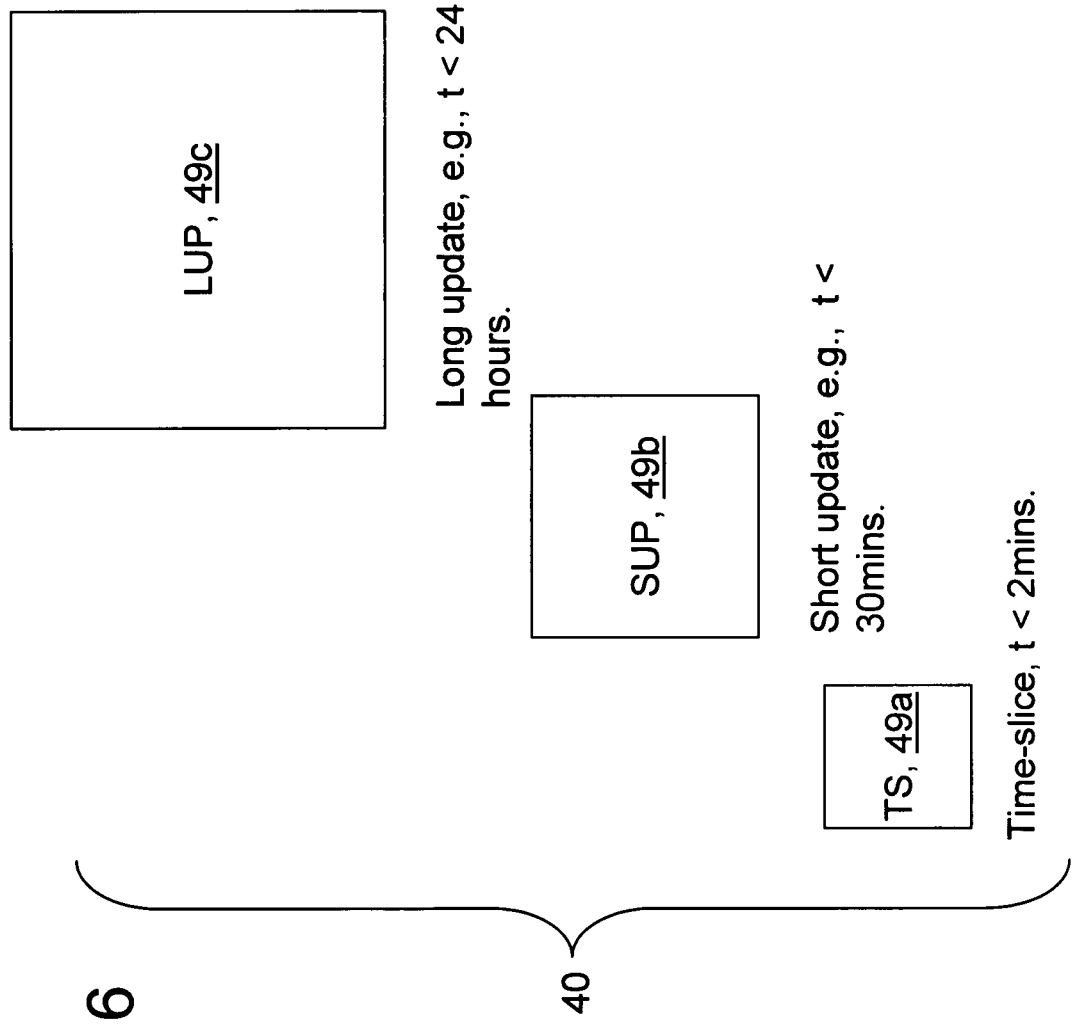
FIG. 6 is a block diagram depicting an arrangement of connection tables.

Referring to FIG. 6, the aggregator 14 uses different connection tables 40 to track data at different time scales. A first connection table 49a is a time-slice connection table that operates on the smallest unit of time, e.g., (a time-slice). A time-slice can be e.g., less than 30 seconds to maybe several minutes. The time-slice connection table is the sum of records received from all collectors during that the time-slice period, corrected for duplicates.

Aggregator analysis algorithms 39 operate primarily on a time slice Connection Table 49a. A set of time slice connection tables is summed into a LUP connection table 49c covering a long update period (LUP), e.g., up to 24 hours. For each recorded parameter (such as TCP bytes from host "A" to host "B"), time slice and LUP tables track both the sum and sum of squares of values of the recorded parameter. These two values allow the aggregator to compute both the mean and variance of the recorded parameter across the table's time period. Given "N" samples $x_1, x_2, \ldots x_n$, mean is sum over the period of the samples divided by the number of samples. The variance is derived from the mean and sum of squares.

At the end of each long update period, that period's values are merged into a profile connection table that includes historical information for the corresponding period of the week. Merging uses the equation below for each value in the profile table. For instance, a LUP table covering the period 12 pm to 6 pm on a Monday is merged into a profile table with historical information about Mondays 12 pm to 6 pm. Values in the profile table are stored as exponentially weighted moving averages (EWMAs). At time "t", a new value "$x_t$" (from the LUP table, for example) is added to the EWMA for time "t−1", denoted by "$m_{t-1}$", to generate a new EWMA value according to the following Equation:

$$m_t = \alpha x_t + (1-\alpha) m_{t-1}$$

where $\alpha$ can be tuned to trade off responsiveness to new values against old ones. EWMAs provide a concise way of representing historical data (both values and variance) and adapting to gradual trends. Recent data is compared to historical profiles from the same time of, an historical time span, e.g., a week because the week is the longest time span that generally shows well-defined periodicity in traffic patterns. By spanning a week, the approach covers diurnal cycles and week/weekend cycles. Recurring events with longer time periods, for example, monthly payroll operations, are less likely to show similarly well-defined patterns.

A collector 12 should handle relatively high rates of network traffic. As the network grows and traffic volume increases, additional collectors 12 can be deployed in appropriate locations to tap new network traffic.

Figure 7:
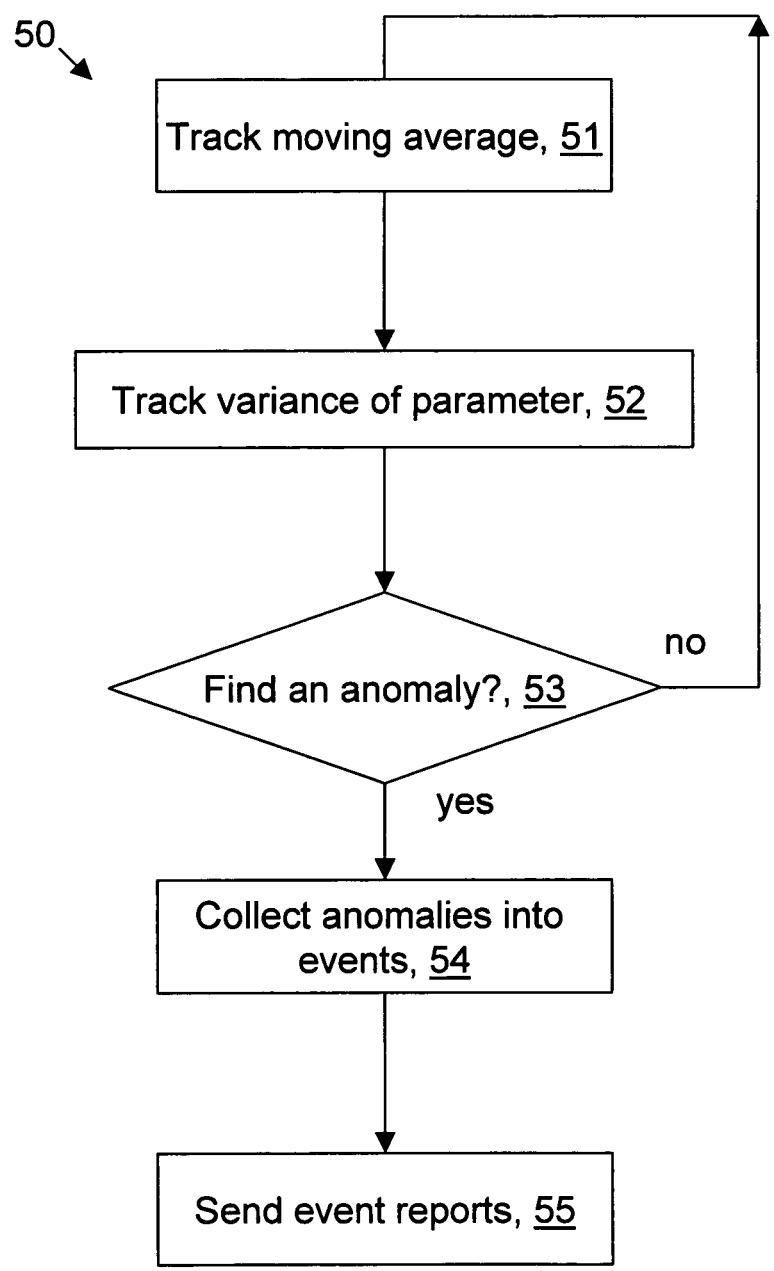
FIG. 7 is a flow chart of processes on the aggregator.

Referring to FIG. 7, a generic flow process 50 of an event detection process is shown. One characteristic of the generic flow process 50 is that in general the processes are historical and profile-driven. The generic flow process 50 tracks 51 a moving average that allow processes to adapt to slowly changing network conditions without user intervention. The generic flow process 50 also tracks 52 a variance of a parameter to allow the generic flow process 50 to account for burstiness in network traffic. Several of the algorithms can optionally be tuned via constants to alter parameters such as sensitivity. Historical analysis minimizes the amount of tuning that needs to be done. The benefits of historical analysis, therefore, are to decrease management complexity while improving analysis quality.

The generic flow process 50 operates at two conceptual levels, anomalies and events. The generic flow process 50 finds 53 anomalies, i.e., low-level discrepancies in the network, e.g., a host is receiving unusually high traffic, for example. Conventional intrusion detection would tend to report anomalies directly to the operator. This can be a problem because a single intrusion may correspond to many anomalies, and many anomalies are benign. In contrast, the system 10 using aggregator 14 collects anomalies into events 54. The operator is sent 55 event reports giving the operator more concise and useful information, while simplifying system management.

Figure 8:
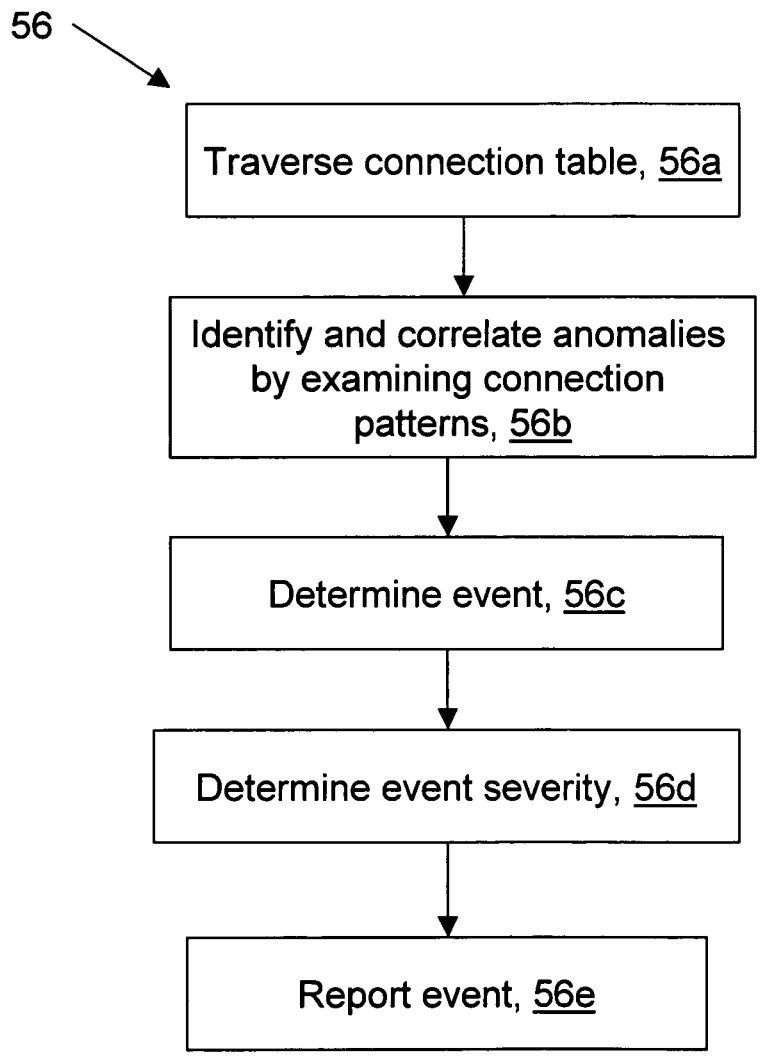
FIG. 8 is a flow chart depicting a generalized process for detection of anomalies and classification of events.

Referring to FIG. 8, processes handle events, i.e., high-level occurrences that have significance to a network administrator. The processes distinguish among different classes of events. A general flow 56 that can underlie some of the processes, discover events by traversing 56a the connection table 40 and identifying 56b and correlating anomalies. From correlated anomalies events are produced 56c. For example, a DoS attack event may be identified because of an abnormal high level of traffic destined to some set of hosts. The generic flow process 50 examines connection patterns rather than packet signatures. Connection patterns can be more strongly correlated with a particular event.

Figure 9:
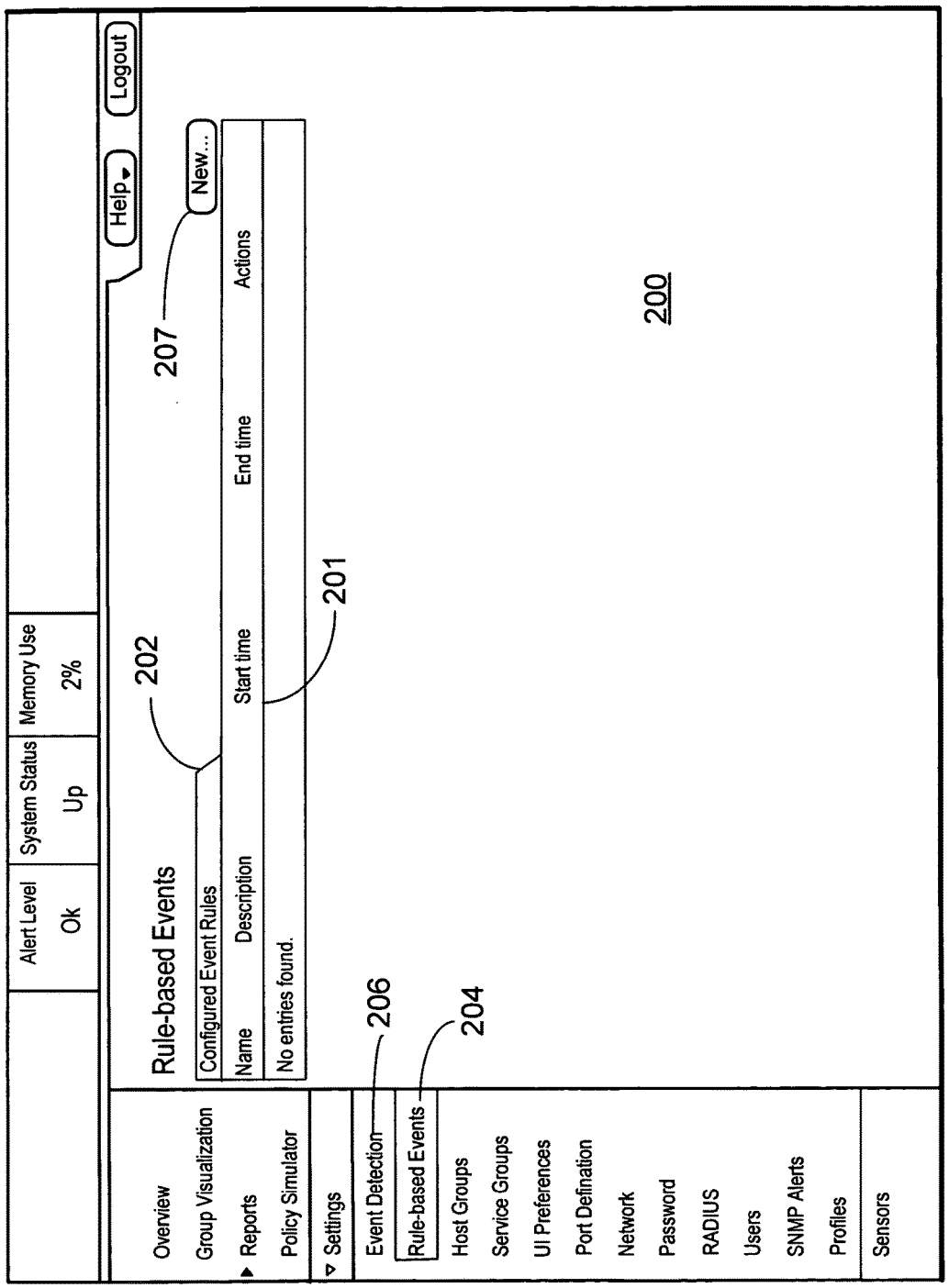
FIG. 9 is a diagram of a configuration graphical user interface.

Referring to FIG. 9 a user interface settings page 200 is shown. The user interface settings page 200 includes a rules-based events Tab 202. The tab displays a list 201 of rule-based events (none being illustrated in FIG. 9). A rule is defined on a worksheet page (FIG. 10) available by selecting the "new" button 207 on, e.g., the Settings page 200 when the settings page has Rule-based Events 204 item selected. An alerting threshold for Rule-based Events is set on the Settings page 200 by selecting Event Detection 206. The interface can also include a button "New Rule Wizard," that launches a wizard to assist a user in producing a new rule. The rules can be labeled with a rule Name, a Description, the Date and time that the ruel was produced and any Actions Users define rules to detect new events. To define a rule, the user specifies, a Name, a Description, client/source, server/destination, traffic direction, ports, a time limit, and severity. The user specifies what type of event to detect. For example the user can specify to detect when a specific parameter exceeds a traffic upper threshold and/or a traffic lower threshold. When the rule's conditions are met, an event is generated with a particular severity determined according to the rule.

The settings page 200 when configured as a Rule-based Events page provides links for producing a new rule via control 207, and for viewing, editing, deleting or copying an existing rule via controls (not shown). Common uses of rule-based events include generating alerts when any connection of a specified type occurs (even if only one packet) and upper or lower limit for traffic of a specific type is exceeded.

Figure 10:
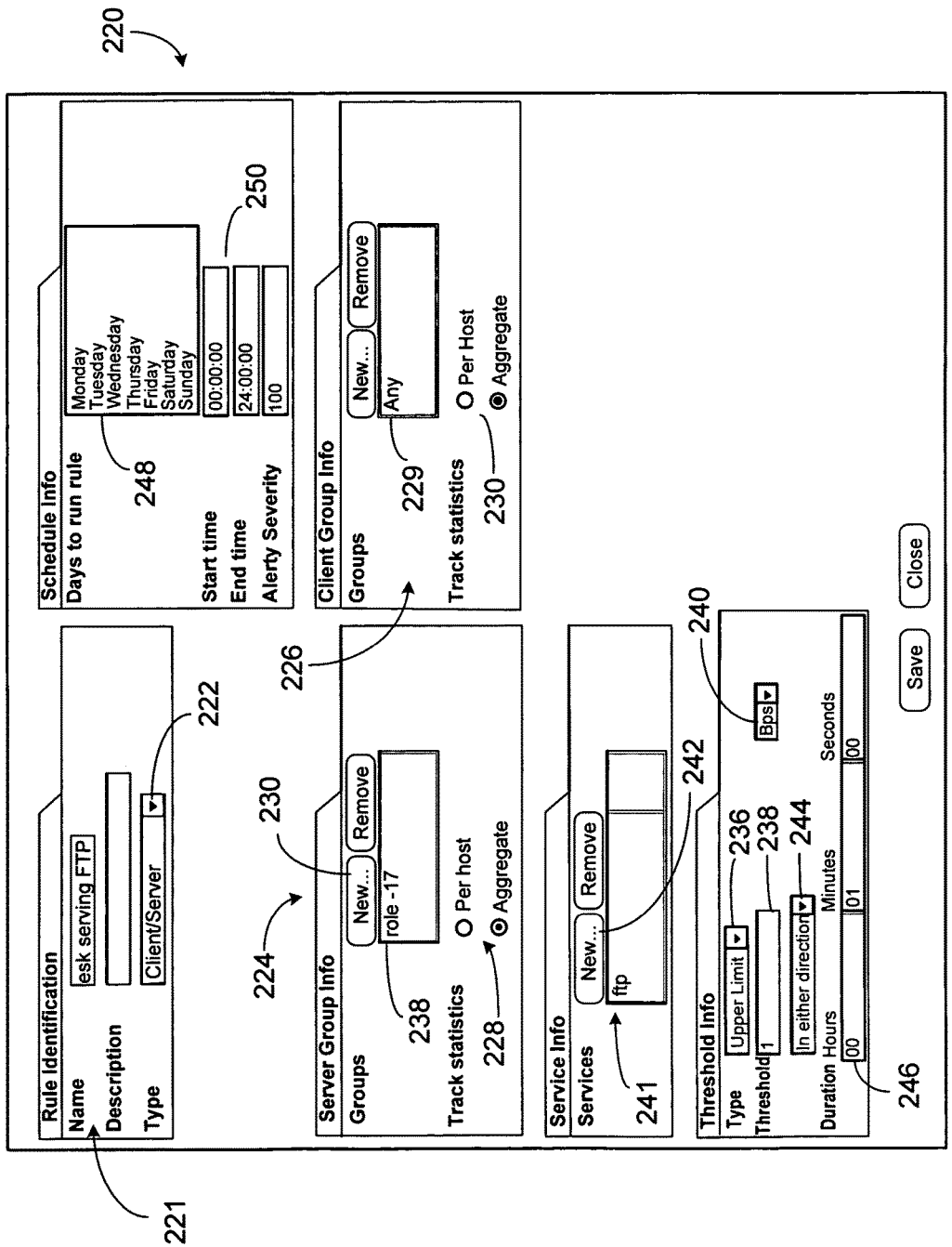
FIG. 10 diagram of a graphical user interface for rule based alerts.

Referring to FIG. 10 a worksheet page 220 for producing a rule is shown. Text input fields can have a comment to the right indicating what format to put information in. If the user makes an error, then a popup can appear when the user tries to save the input, telling the user which field was incorrectly entered. The worksheet includes fields 221 for name and description.

The worksheet page 220 includes a type field 222, which determines whether to interpret the first host-group 224 and second host group 226 as client/server, source/destination or any of these. The second host-group 226 is automatically defined as the opposite of the first host-group 224. The first group, e.g., the server group 224 includes radio buttons 228, 230 to track statistics on, e.g., a per host (radio button 228) or an aggregate (radio button 230) basis that is, whether the rule is apply to any host in the group or to the aggregate of the entire group's traffic.

When type field 222 is client/server the interface 200 displays Source-Client/Destination-Server fields 224, 226 as shown populated with client and server tabs. When the user clicks "New" 230 a popup window (not shown) appears that has radio buttons to allow a user to either choose an address of a node, e.g., a Classless Inter-Domain Routing address (CIDR) or to choose a grouped set of nodes, e.g., a role based group by the grouping process mentioned above or a custom group. If the user selects a CIDR, the user types in a CIDR value, e.g., 1.2.3.4/16. If the user selects a group, there are 2 dropdowns, for group-type and for group. After the user selects OK, the list box is updated if the input was correct. Not selecting anything means any source or destination. When field 222 is source/destination (not show) the group fields 224 and 226 show source and destination fields to fill in data.

The services area 241 allows a user to track ports and/or protocol. For ports, the user can specify any set of ports or port groups, as well as, any protocol. The user interface 220 includes a new button 242 that launches a popup (not shown) that includes three fields. A first field in the popup is protocol, which is a text field where a user enters the protocol name. A second field is port, which is a text field to enter protocol/port like TCP/80. A third is Port Group, a drop-down where the user selects a port group.

The user interface 220 includes a threshold Type 236 here shown as drop down with either an Upper Limit or a Lower Limit type value, for selecting either an upper threshold or lower threshold depending on the rule type. Threshold Box 238 is a text field accepting an integer value as, e.g., Units Box 240 a dropdown with "bytes per second" or "packets per second." After the user sets an upper or lower threshold, the user is prompted to enter a parameter value for the threshold, either packets per second or bytes per second, an amount of time that the traffic should remain above or below the threshold, with time having a granularity of a time-slice. The default for that will be 1 time slice. The duration box 246 on the user interface is a text field that accepts a time value input, e.g., "4 m", or "30 s", or "2 m 20 s" input or as a multiple of a time slice.

A Direction field 244 on the user interface specifies traffic direction, i.e., to specify the direction that traffic will be monitored. For instance, if the first host-group is defined as a client or server, then the interface can present three options, Inbound to Server, Outbound to Client or Either Direction.

A schedule section 248 includes a Days field, a multi-select-box with all days of week in it, with all days being selected by default, a Time Start box used to specify the start time for running the rule each day specified and an Stop Time/Rule Duration specifies the time to stop running the rule. The schedule allows the user to specify when the rule is active. The user defines a begin time and an end time. The user also chooses when the rule runs. For example the user can choose to have the rule run daily or specify days of the week for the rule to run on, etc.

Severity 250 allows a user to specify 1-100. For severity, the user can choose a value, e.g., a number between 1 and 100. A user can use the rule based alert to check traffic based on the day of the week and time period when it occurs, source group and destination group, client group and server group, services used or provided, direction of the threshold crossing (upper limit or lower limit), for client/server groups, the direction of traffic (inbound to server, outbound to client, or both) and duration of the condition necessary to qualify as an event. The user sets the rule to apply to individual hosts in the groups or to the group statistics in the aggregate. The per-host or aggregate settings can be applied to the source and destination groups independently.

General details on the various choices for content of the page 220 are given in Table 1.

| Field | Description and Format | Examples |
|---|---|---|
| Rule name | any combination of letters, digits and characters except single quotations | name; stop all |
| Rule description | any combination of letters, digits and characters except single quotations | stop all traffic |
| type of rule | "sd" for source/destination rule or "cs" for a client/server rule | sd; cs |
| days of the week | days of the week when a rule is applicable; comma-separated list of names of days. An empty field means all days. | Sun Mon, Wed, Fri |
| Start time | time when a rule becomes applicable; 24-hour HH:MM:SS format | 10:00:01 23:04:26 |
| end time | time when a rule stops being applicable; 24-hour HH:MM:SS format | 00:00:01 18:03:38 |
| Severity | severity of the event generated by the rule | 28 |
| Service | comma-separated list of services to which rule is applicable. Each item can be one of the following: tcp/NNN (tcp port number) udp/NNN (udp port number) PPP (other protocol number) service group name An empty field means all. | tcp/22, mail tcp/22 udp/53 1 mail |
| set1 group | comma-separated list of destination groups or server groups (depending on rule type); Each item can be one of the following: CIDR block m/GROUPNAME (for manual groups) a/GROUPNAME (for automatic groups) | 1.0.0.0/8, m/s2 10.0.0.0/8 m/segment_192 a/workstations |
| set1 stats type | Type of statistics tracking used for set1: ph (per host) ag (aggregate) | ph; ag |
| set2 group | comma-separated list of source groups or client groups (depending on rule type); Each item can be one of the | 1.0.0.0/8, m/s2 |

| Field | Description and Format | Examples |
|---|---|---|
| | following: CIDR block m/GROUPNAME (for manual groups) a/GROUPNAME (for automatic groups) | 10.0.0.0/8 m/segment_192 a/workstations |
| set2 stats type | Type of statistics tracking used for set2: ph —per host ag —aggregate | ph; ag |
| threshold type | can be one of the following: ll —lower limit ul —upper limit | |
| threshold | the value of the event detection threshold | 1000 |
| threshold unit | measurement units for detection threshold: "pps" or "Bps" | pps; Bps |
| direction | direction of traffic; applicable only when the rule is for client-server events. Can be: to_client to-server either | |
| Duration | duration for which the value must remain above or below the threshold to be recognized as an event; HH:MM:SS format | 00:01:00 |

Figure 11:
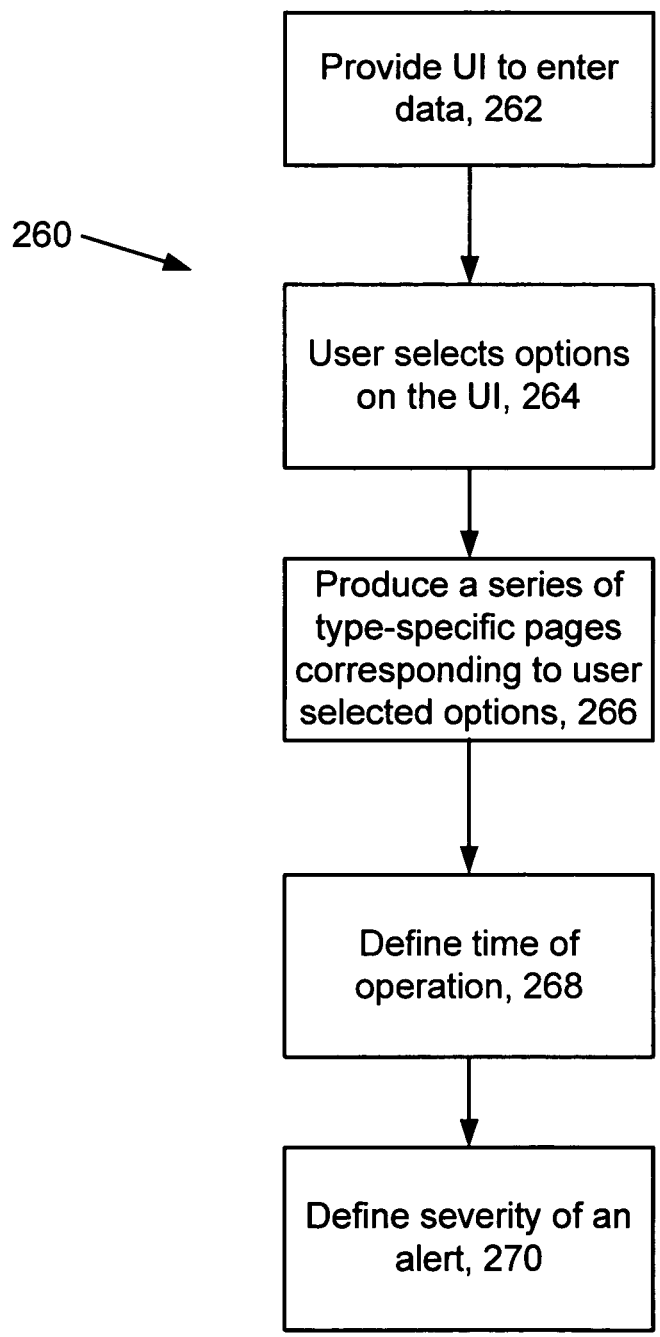
FIG. 11 is a flow chart depicting a rule based alert wizard.

Referring to FIG. 11, a new rule wizard process can be implemented as a series of pop-ups with Next and Previous buttons. The final popup can have a Finish button that stores and complies the rule for execution. The new rule wizard provides 262 a user interface, e.g., a popup window includig options such as: Detect a failed service, Detect presence of services, Detect communication between certain hosts or groups, Detect hosts exceeding traffic thresholds. The user selects 264 one or more of these options. Once selected, the new rule wizard produces 266 a series of type-specific pages, for the selected detection option. Specific data for each of the options mentioned above is shown below in Table 2. Following entry of the type specific options, the wizard process 260 produces 268 a page for defining the time of operation, and produces 270 a page to define a severity value of the alert.

Table 2 shows the pages corresponding to the rule types, and also the settings implicit in the rule type (marked by *).

TABLE 2

Detect a failed service
    ask for server(s)
    ask for port(s)
    ask for how long service needs to be inactive
    ask for lower bound on traffic, or else for 0
    * Set outbound pps lower-threshold, client=any
Detect presence of services
    ask for host(s) (becomes server)
    ask for relevant service(s)
    *Set outbound pps upper-threshold=0, client=any, duration=shortest
Detect communication between certain hosts or groups
    Get hosts in group 1
    Get hosts in group 2
    *Set pps upper-threshold=0, either direction, duration=shortest
Detect hosts exceeding traffic thresholds
    Get host(s) (becomes source)
    Get traffic threshold
    *Set pps upper threshold, duration=0 shortest In order to reduce the possibility of a flood of alerts during certain attack scenarios, if the same rule is violated within, a specified time period, e.g., within 5 minutes of the last time it was violated, the subsequent violation will be rolled into the previous event. So for example, if there is a rule that says that "Group 1" may not connect to "Group 2", and then a worm breakout occurs that produces many connections between Group1 and Group 2, then all of those violations will be considered one event.

An event details page (not shown) can display the rule that used to detect the event. The event details page can embed a flow report for the relevant traffic, e.g., the relevant services, on the relevant host's, for the relevant time period.

Embedding flow reports assumes that the flow reports apply to all of a host's traffic, or else to the traffic for any host-pair. The flow report shows the relevant services for the relevant time period. A link on the event page can be provided to the flow report page. The event will save the flow report for embedding in the event detail on disk. These reports can be saved for a longer period than flows generally, but may be deleted to save space. The event report will include the basic information from the flow report for the case that the flow report gets deleted.

Exemplary screen content for different rule violations are depicted below:

Access Rule Violation (0 threshold)
Rule triggered: <Rule description>
Time: <time of first violation>
Duration: <duration>

| Time | Source | Dest | Protocol | Port | Duration | Conn | Bytes | Packets |
|---|---|---|---|---|---|---|---|---|

Threshold Exceeded
Rule triggered: <Rule description>
Time: <time of first violation>
Duration: <duration>

| Time | Source | Dest | Protocol | Port | Duration | Conn | Bytes | Packets |
|---|---|---|---|---|---|---|---|---|

Silent service (traffic dropped below threshold)
Rule triggered: <Rule description>
Time: <time of first violation>
Duration: <duration>

| Time | Duration | Host | Conn | Bytes | Packets |
|---|---|---|---|---|---|

Alerting Thresholds

Figure 12:
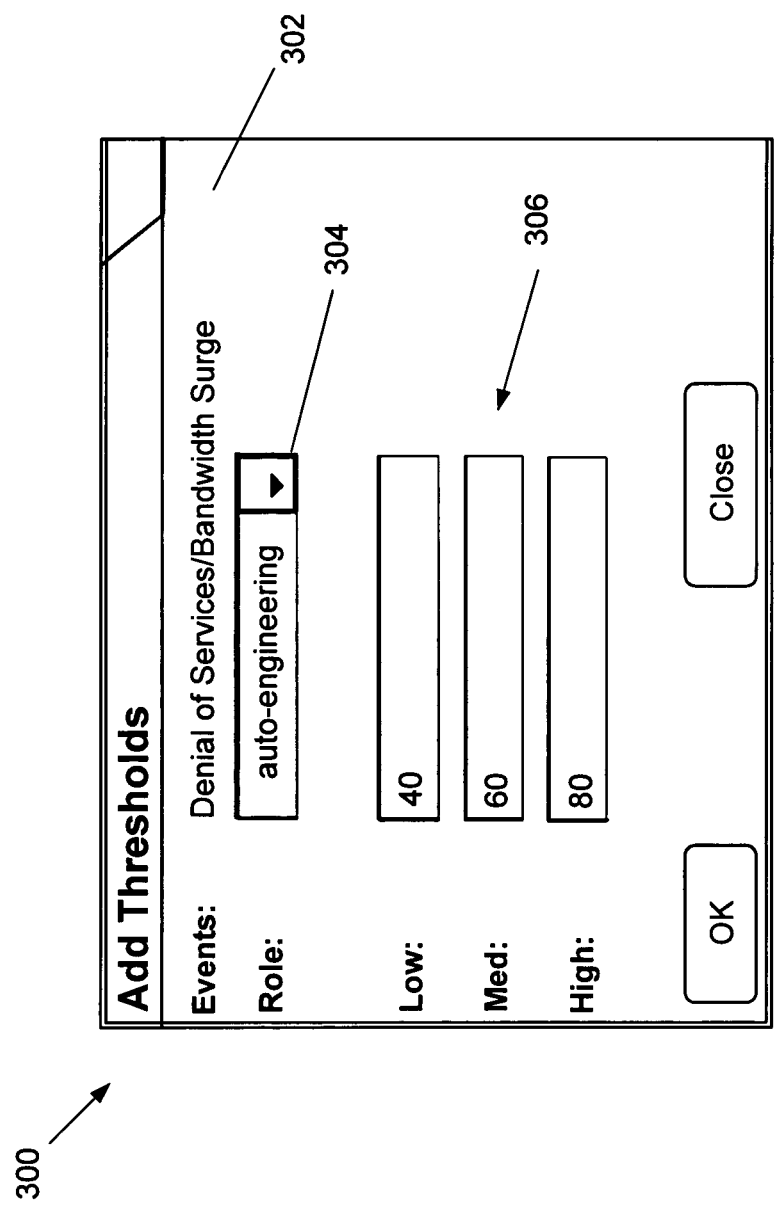
FIG. 12 is a graphical user interface depicting alert threshold setting.

Referring now to FIG. 12, low medium and high thresholds can be set for each individual host group and for each event type that has an alerting threshold. A New Host, a Silent Host, a Sensor Down, and a Sensor Invalid event type does not use alerting thresholds. The user can add, modify or remove alerting threshold settings using the Event Detection Settings page. Additionally, this page links to pages for advanced tuning of the processes that detect events.

To add a threshold for a high, medium or low alert in the list of events 202 (FIG. 9), the user selects the type of event and chooses Add, which displays an Add Threshold page 300. A list of roles 304 is displayed allowing a user to select the role for which the user desires to set event alert thresholds for the event type 302. The user enters the severity levels at which the event is to trigger High, Medium, and Low alerts and applies the values 304. An existing event alerting threshold can be modified and an alerting threshold can be removed.

Figure 13:
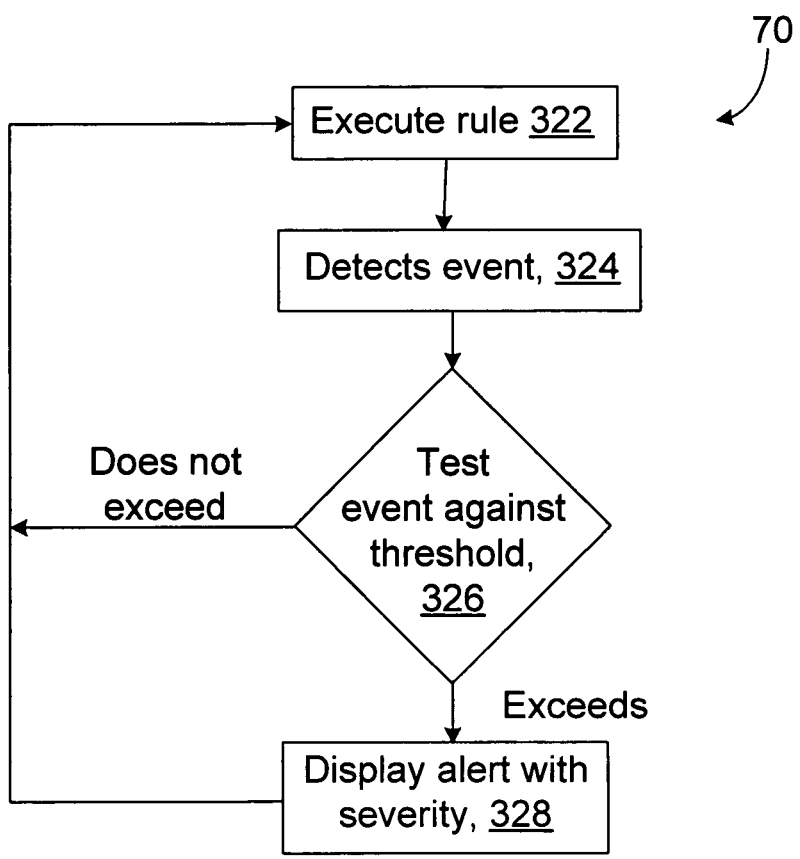
FIG. 13 is a flow chart depicting processing of event-based rules.

Referring to FIG. 13, a rule-based event processing that is executed or triggered when the conditions of a user-defined rule are satisfied is shown. The process 320 executes 322 the user-defined rules according to the specified schedule. The rule specifies an event and a severity. When the system 10 detects 324 the event, the system 10 tests 326 the severity level of the event against alerting threshold for Rule-based Events. If the severity of the event exceeds Low, Medium, or High alerting thresholds, then the system displays 328 an alert message according to the threshold that was exceeded.

A number of embodiments of the invention have been described. Nevertheless, it will be understood that various modifications may be made without departing from the spirit and scope of the invention.

What is claimed is:

1. A method for detecting an intrusion event in a network, the method comprising:
receiving a threshold value for a monitored network parameter, wherein the threshold value is received from a user via a user interface (UI) associated with a computer, and wherein the threshold value corresponds to an alert severity level;
receiving a threshold type for the monitored network parameter, wherein the threshold type is received from the user via the UI, and wherein the threshold type specifies either a lower limit or an upper limit for the threshold value;
receiving a time duration for the monitored network parameter, wherein the time duration is received from the user via the UI;
constructing, by the computer, a rule for detecting a network intrusion event based on the threshold value, the threshold type, and the time duration;
compiling the constructed rule for execution; and
executing the constructed rule, wherein said executing the constructed rule comprises:
generating an alert when the monitored network parameter remains above the threshold value during the entire time duration when the threshold type is an upper limit;
generating the alert when the monitored network parameter remains below the threshold value during the entire time duration when the threshold type is a lower limit; and
wherein a severity level of the alert is set to the alert severity level corresponding to the threshold value.

2. The method of claim 1, further comprising:
receiving information about a first set of nodes and a second set of nodes in the network; and
determining whether the second set of nodes are clients, servers, source nodes, or destination nodes based on the received information about the first set of nodes.

3. The method of claim 1, further comprising receiving information on whether the rule applies to a host or to an aggregate of an entire node set's traffic.

4. The method of claim 1, further comprising receiving information specifying a start time and a stop time for application of the rule.

5. The method of claim 1, further comprising:
receiving information specifying services for which the rule is applicable, wherein a respective service is specified by at least a port and a protocol.

6. A non-transitory computer-readable storage medium storing instructions which when executed by a computer cause the computer to perform a method for detecting an intrusion event in a network, the method comprising:
receiving a threshold value for a monitored network parameter, wherein the threshold value is received from a user via a user interface (UI) associated with the computer, and wherein the threshold value corresponds to an alert severity level;
receiving a threshold type for the monitored network parameter, wherein the threshold type is received from the user via the UI, and wherein the threshold type specifies either a lower limit or an upper limit for the threshold value;
receiving a time duration for the monitored network parameter, wherein the time duration is received from the user via the UI;
constructing a rule for detecting a network intrusion event based on the threshold value, the threshold type, and the time duration;
compiling the constructed rule for execution; and
subsequently executing the constructed rule, wherein said executing the constructed rule comprises:
generating an alert when the monitored network parameter remains above the threshold value during the entire time duration when the threshold type is an upper limit;
generating the alert when the monitored network parameter remains below the threshold value during the entire time duration when the threshold type is a lower limit; and
wherein a severity level of the alert is set to the alert severity level corresponding to the threshold value.

7. The non-transitory computer-readable storage medium of claim 6, wherein the method further comprises:
receiving information about a first set of nodes and a second set of nodes in the network; and
determining whether the second set of nodes are clients, servers, source nodes, or destination nodes based on the received information about the first set of nodes.

8. The non-transitory computer-readable storage medium of claim 6, wherein the method further comprises receiving information on whether the rule applies to a host or to an aggregate of an entire node set's traffic.

9. The non-transitory computer-readable storage medium of claim 6, wherein the method further comprises receiving information specifying a start time and a stop time for application of the rule.

10. The non-transitory computer-readable storage medium of claim 6, wherein the method further comprises receiving information specifying services for which the rule is applicable, wherein a respective service is specified by at least a port and a protocol.

11. A system for detecting an intrusion event in a network comprising:
a processor; and
a non-transitory storage medium storing instructions which, when executed by the processor, cause the system to perform a method comprising:
receiving a threshold value for a monitored network parameter, wherein the threshold value is received from a user via a user interface (UI) associated with the system, and wherein the threshold value corresponds to an alert severity level;
receiving a threshold type for the monitored network parameter, wherein the threshold type is received from the user via the UI, and wherein the threshold type specifies either a lower limit or an upper limit for the threshold value;
receiving a time duration for the monitored network parameter, wherein the time duration is received from the user via the UI;
constructing a rule for detecting a network intrusion event based on the threshold value, the threshold type, and the time duration;
compiling the constructed rule for execution; and
executing the constructed rule, wherein said executing the constructed rule comprises:
generating an alert when the monitored network parameter remains above the threshold value during the entire time duration when the threshold type is an upper limit;
generating the alert when the monitored network parameter remains below the threshold value during the entire time duration when the threshold type is a lower limit; and
wherein a severity level of the alert is set to the alert severity level corresponding to the threshold value.

12. The system of claim 11, wherein the non-transitory storage medium further comprises instructions that, when executed by the processor, cause the system to:
receive information about a first set of nodes and a second set of nodes in the network; and
determine whether the second set of nodes are clients, servers, source nodes, or destination nodes based on the received information about the first set of nodes.

13. The system of claim 11, wherein non-transitory storage medium further comprises instructions that, when executed by the processor, cause the system to receive information specifying whether the constructed rule applies to a host or to an aggregate of an entire node set's traffic.

14. The system of claim 11, wherein the non-transitory storage medium further comprises instructions that, when executed by the processor, cause the system to receive information specifying a start time and a stop time for application of the constructed rule.

15. The system of claim 11, wherein the non-transitory storage medium further comprises instructions that, when executed by the processor, cause the system to receive information specifying services for which the rule is applicable, wherein a respective service is specified by at least a port and a protocol.

* * * * *